April 2, 1929.  A. L. ROBERTS  1,707,877
REDUCING GEAR
Filed June 18, 1927  4 Sheets-Sheet 1
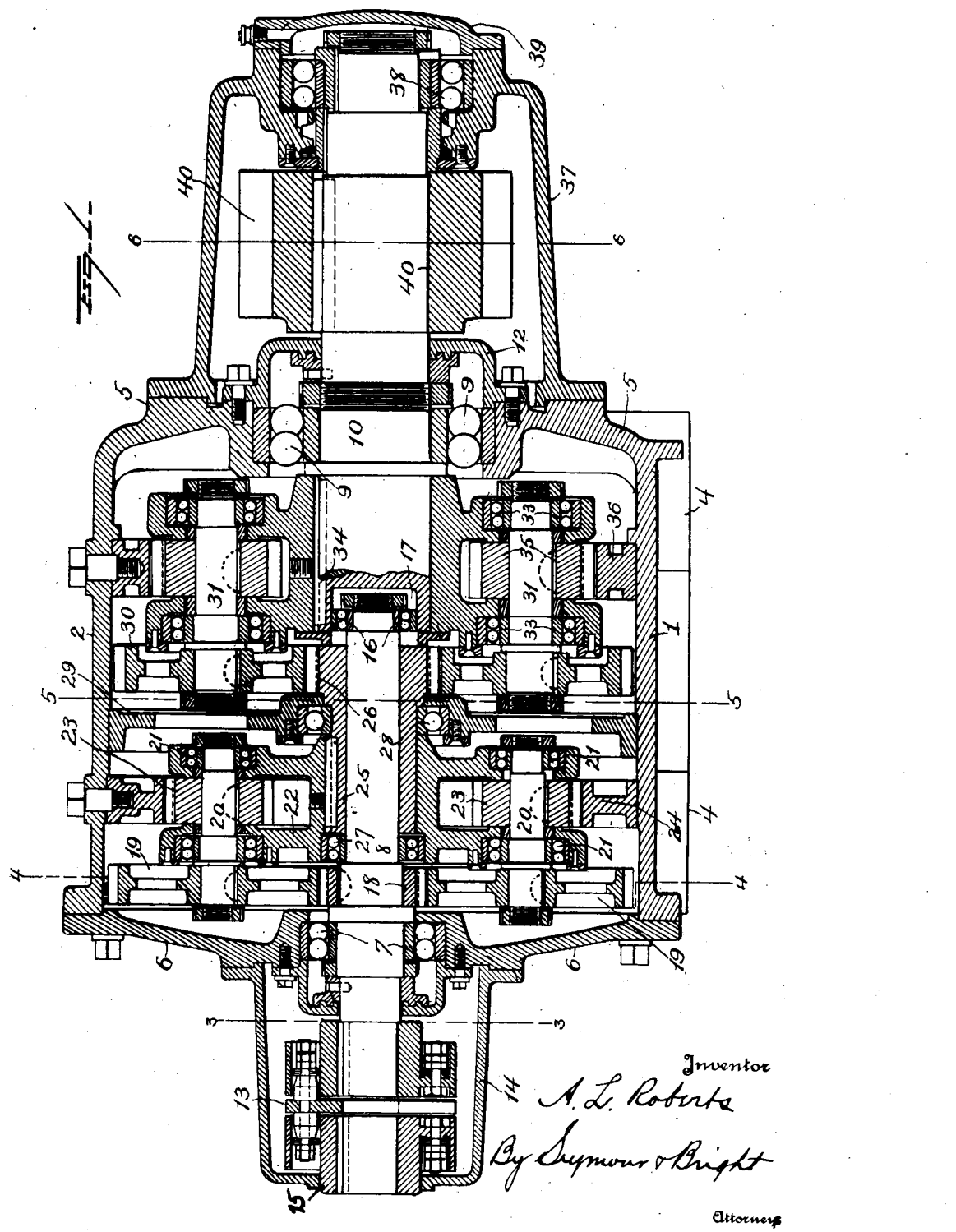

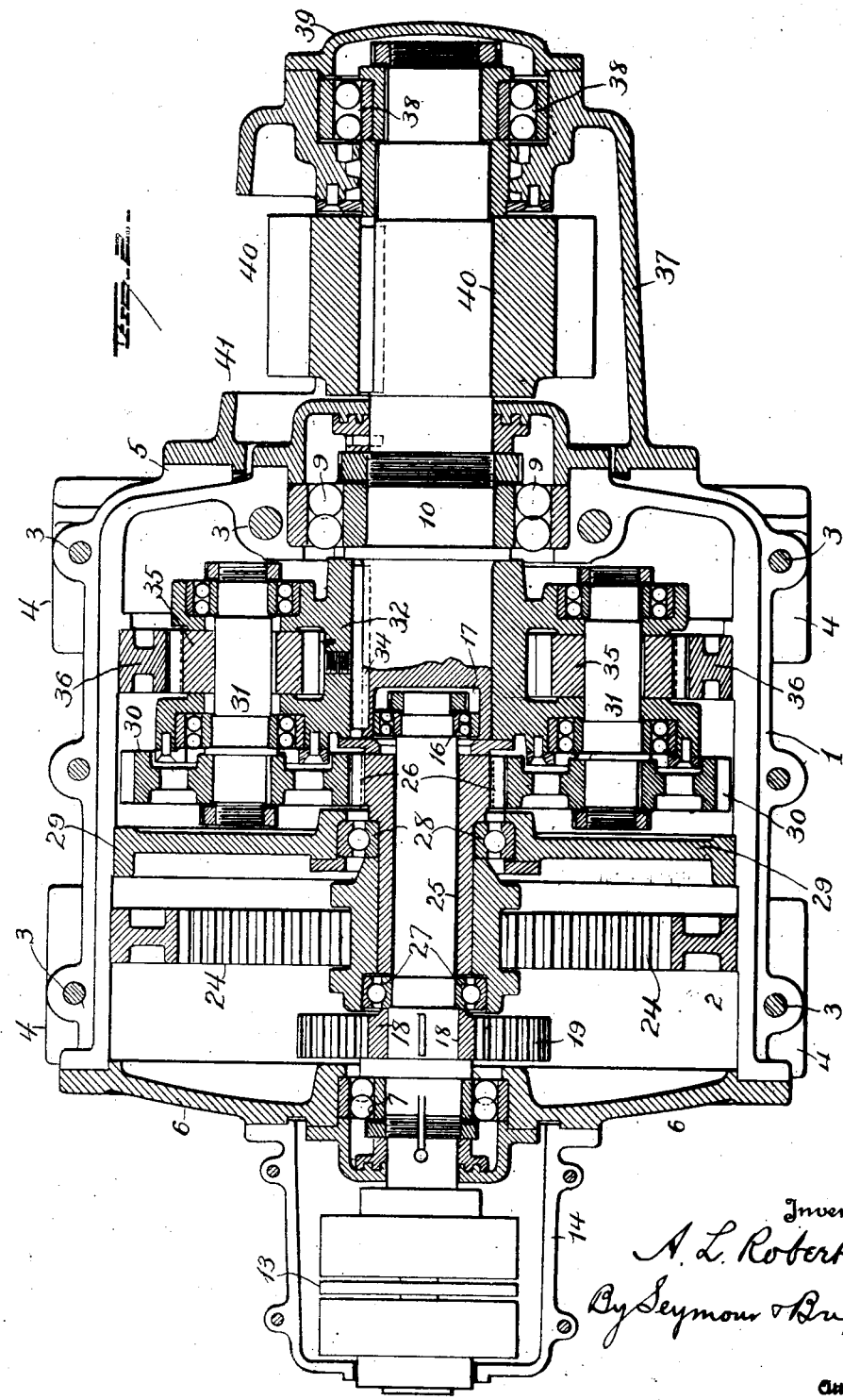

April 2, 1929.  A. L. ROBERTS  1,707,877
REDUCING GEAR
Filed June 18, 1927  4 Sheets-Sheet 3
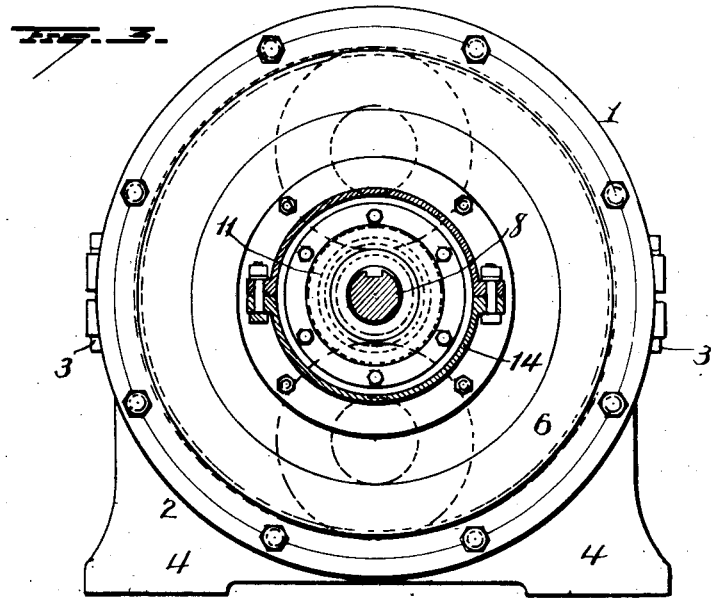
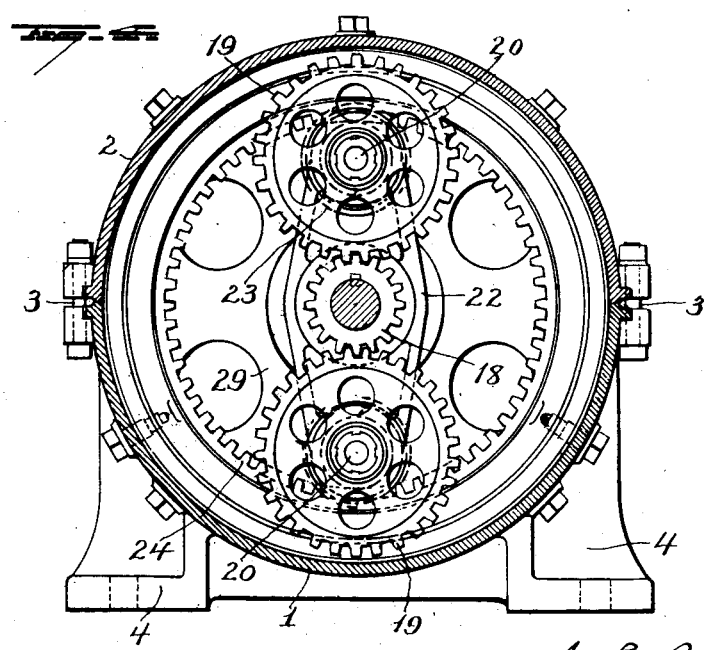
Inventor
A. L. Roberts
By Seymour & Bright
Attorneys April 2, 1929. A. L. ROBERTS 1,707,877
REDUCING GEAR
Filed June 18, 1927 4 Sheets-Sheet 4
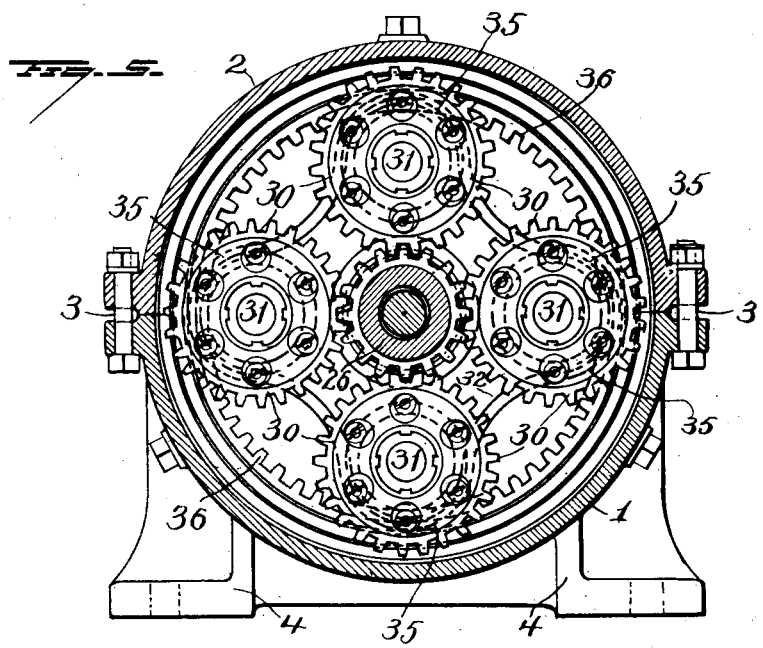
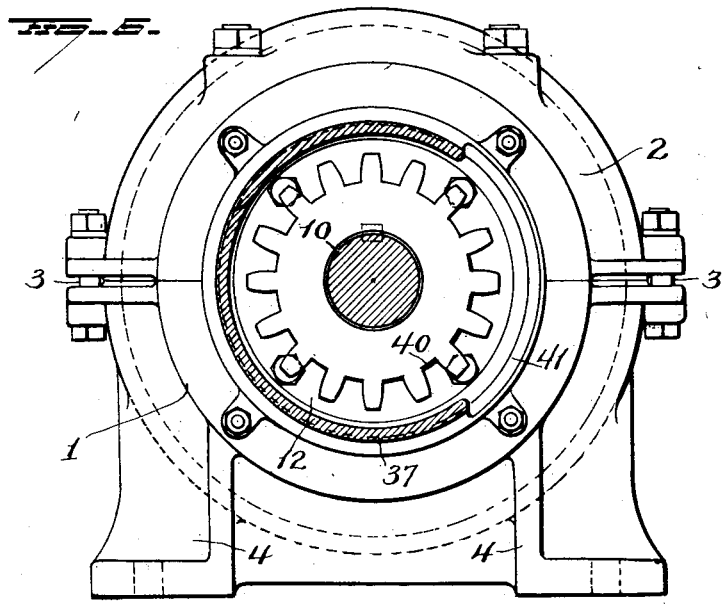
Inventor
A. L. Roberts
By Seymour & Bright
Attorney Patented Apr. 2, 1929.

1,707,877

UNITED STATES PATENT OFFICE.

ALVIN L. ROBERTS, OF PHILADELPHIA, PENNSYLVANIA.

REDUCING GEAR.

Application filed June 18, 1927. Serial No. 199,678.

This invention relates to mechanism for transmitting power from a high-speed motor to a driven shaft at a greatly reduced speed, one object of the invention being to provide an adequate support for the driven shaft without extraneous parts. It is also an object of the invention to provide a compact novel arrangement of planetary gears for transmitting motion from the driving to the driven shaft, and the invention resides in certain novel features which will be particularly pointed out in the claims following a detailed description.

In the accompanying drawings, Figure 1 is a vertical central longitudinal section of a speed-reducing gearing embodying the invention;

Figure 2 is a central horizontal longitudinal section of the same;

Figures 3, 4, 5 and 6 are transverse sections on the lines 3—3, 4—4, 5—5 and 6—6, respectively, of Figure 1.

The gearing is housed within a casing consisting of a lower member 1 and a similar upper member 2 resting thereon and secured by bolts 3, the lower member being provided with feet 4 whereby it may be secured upon a fixed bed plate or foundation. At one end of the casing, head members 5 are formed integral therewith and at the opposite end head plates 6 are bolted thereto, a bearing 7 for the driving shaft 8 being mounted in the head 6 and a bearing 9 for the driven shaft 10 being mounted in the head 5. Caps 11, 12 are secured upon the respective heads to surround the bearings, excluding dust and permitting the bearings to run in oil. The outer end of the driving shaft projects through and beyond the cap 11 and is fitted into a flexible coupling 13 whereby it may be connected to an electric motor or prime mover, a hood 14 being secured to the head 6 to enclose the coupling and protect against chance blows. An opening 15 in the end of the hood accommodates the end of the coupling and the motor shaft. The bearing 7 supports the outer portion of the driving shaft 8 and the inner end of said shaft is journaled in a bearing 16 located in a socket 17 in the inner end of the driven shaft 10, as shown.

Keyed upon the driving shaft, adjacent the head 6 is a pinion 18 which meshes with planetary pinions 19 which are arranged at diametrically opposite points with respect to the driving pinion 18 and are of greater diameter than the latter. The pinions 19 are fixed upon the ends of shafts 20 which are journaled in bearings 21 provided therefor in an arm or frame 22, said arm or frame being disposed in diametric relation to the driving shaft and free to rotate about the axis of the shaft. On the shafts 20, between the bearings 21, are secured pinions 23 which mesh with the internal teeth of a ring gear or rack 24 which is bolted rigidly to the main casing and does not rotate. It will be readily seen that, inasmuch as the pinions 23 engage the fixed rack 24, if the driving shaft and pinion 18 rotate, the frame 22 will rotate in the same direction as the shaft but at a lower speed, the reduction, with the several elements in the illustrated proportions, being from 1500 R. P. M. for the driving shaft to 160 R. P. M. for the frame.

The frame 22 is keyed at its center upon the extended hub 25 of a pinion 26 so that said pinion will rotate with the frame, the pinion encircling the driving shaft but being free thereof, as shown. The frame 22 and pinion 26 are supported by two bearings 27 and 28, the bearing 27 being placed on the driving shaft and the bearing 28 being located in a disk 29 which is rigidly bolted to the main casing. The pinion 26 meshes with planetary gears 30 which are arranged equidistantly about said pinion 26 and are fixed upon shafts 31 carried by a frame 32 and journaled in bearings 33 provided therefor in said frame. Owing to the increased load upon the gears 30, due to the reduction in speed, four gears 30 are provided as compared with two gears 19. The frame 32 is keyed to the inner end of the driven shaft 10, as at 34, and upon the shafts 31, between the bearings 33, are secured pinions 35 which mesh with an internal ring gear or rack 36 rigidly bolted to the main casing. Inasmuch as the pinion 26 is keyed to the frame 22, it will rotate at the same speed and in the same direction as the frame and it is the actuating element for the second planetary train. The pinions 35 being in mesh with the fixed rack 36, the driven shaft will rotate in the same direction as the pinion 26 but at a lower speed, the reduction in the present instance being from 160 R. P M. for the pinion 26 to 23.4 R. P. M. for the driven shaft.

A hood 37 is secured upon the head 5 to enclose the end of the driven shaft and this hood supports a bearing 38 for the extreme end of the shaft, a dust cap 39 being secured to the hood to close the end thereof and protect the bearing. A gear 40 is secured on the shaft 10 within the hood 37 and an opening 41 is provided in the side of the hood to permit access of a gear which may transmit motion from the gear 40 to machinery which is to be operated. By shifting the bolts which secure the hood to the main casing, the slot or opening 41 may be disposed at either side, top or bottom as the necessities of any given conditions may demand, and it is to be understood that a pulley or a sprocket may be substituted for the spur gear 40, if desired.

In speed-reducing mechanisms as now generally provided, the driven shaft is insufficiently supported and an extra outer bearing must be provided when the machine is set up for use. By the present invention, this difficulty is overcome and the driven shaft is perfectly supported, the device being a complete unit in itself with no extraneous parts required. The arrangement of the compound planetary gearing and the rotatable frames which carry the planets of the several trains economize space and produce a very efficient and easily operated mechanism.

Having fully described my invention what I claim as new and desire to secure by Letters Patent, is:—

1. The combination of a casing, alined driving and driven shafts in the casing, circular racks fixed in the casing concentric with the respective shafts, a frame encircling and mounted to rotate about the driving shaft, a plurality of trains of planetary gears carried by said frame and having axes in common, a pinion on the driving shaft at the outer side of said frame meshing with the gears of one train, the gears of the other train meshing with one circular rack, a frame secured to the driven shaft, a plurality of trains of planetary gears carried by said last-mentioned frame, and a gear loosely encircling the driving shaft and having its hub secured within the first-mentioned frame, said gear meshing with one train of gears on the second-mentioned frame and the other train of said gears meshing with a second circular rack.

2. The combination of a casing, alined driving and driven shafts therein, a frame encircling and secured upon the driven shaft, a frame encircling and rotatable about the driving shaft, a bearing disk secured in the casing between said frames, trains of planetary gearing carried by the respective frames, a gear actuating the gearing on the frame secured to the driven shaft and having an extended hub encircling the driving shaft and journaled through the disk and secured in the frame which encircles the driving shaft, and a pinion secured on the driving shaft at the outer side of and actuating the gearing on the last-mentioned frame.

In testimony whereof, I have signed this specification.

ALVIN L. ROBERTS.